United States Patent
Bernard et al.

(10) Patent No.: US 9,178,613 B2
(45) Date of Patent: *Nov. 3, 2015

(54) NETWORK INTERFACE DEVICE SYNCHRONIZATION

(71) Applicant: Calix, Inc., Petaluma, CA (US)

(72) Inventors: Christopher T. Bernard, Wayzata, MN (US); Dean M. Dunnigan, Delano, MN (US)

(73) Assignee: Calix, Inc., Petaluma, CA (US)

(*) Notice: Subject to any disclaimer, the term of this patent is extended or adjusted under 35 U.S.C. 154(b) by 46 days.

This patent is subject to a terminal disclaimer.

(21) Appl. No.: 14/100,736

(22) Filed: Dec. 9, 2013

(65) Prior Publication Data

US 2014/0105597 A1 Apr. 17, 2014

Related U.S. Application Data

(63) Continuation of application No. 12/916,880, filed on Nov. 1, 2010, now Pat. No. 8,630,546.

(51) Int. Cl.
| | |
|---|---|
| *H04B 10/00* | (2013.01) |
| *H04B 10/079* | (2013.01) |
| *H04B 7/212* | (2006.01) |
| *H04J 3/06* | (2006.01) |
| *H04J 14/08* | (2006.01) |
| *H04Q 11/00* | (2006.01) |

(52) U.S. Cl.
CPC .......... *H04B 10/0795* (2013.01); *H04B 7/2125* (2013.01); *H04J 3/0647* (2013.01); *H04J 3/0682* (2013.01); *H04J 14/08* (2013.01); *H04Q 11/0067* (2013.01); *H04Q 2011/0045* (2013.01); *H04Q 2011/0079* (2013.01)

(58) Field of Classification Search
USPC .................................................. 398/154, 155
See application file for complete search history.

(56) References Cited

U.S. PATENT DOCUMENTS

| | | | |
|---|---|---|---|
| 8,630,546 B2 | 1/2014 | Bernard et al. | |
| 2005/0185631 A1 | 8/2005 | Bernard et al. | |
| 2007/0230955 A1* | 10/2007 | Miller et al. | 398/59 |
| 2007/0230956 A1 | 10/2007 | Ikeda et al. | |
| 2007/0291777 A1 | 12/2007 | Jamieson et al. | |
| 2009/0269053 A1* | 10/2009 | Yang | 398/22 |

(Continued)

FOREIGN PATENT DOCUMENTS

| | | | | |
|---|---|---|---|---|
| WO | 2010105475 A1 | 9/2010 | | |
| WO | WO 2010/105475 | * | 9/2010 | H04B 10/00 |

OTHER PUBLICATIONS

ITU-T: "Gigabit-capable Passive Optical Networks (G-PON): Transmission convergence layer specification", ITU-T, G.984.3, Amendment 2, Nov. 2009, 14 pages.*

(Continued)

*Primary Examiner* — Li Liu
(74) *Attorney, Agent, or Firm* — Shumaker & Sieffert, P.A.

(57) ABSTRACT

Techniques are disclosed that relate to synchronizing a clock on a network interface device with a clock on an optical line terminal (OLT). In one example, the technique to synchronizing the clocks may include monitoring one or more instances when the network interface device transmits information to the OLT and determining when a frame should be received by the network interface device based on the monitored one or more instances when the network interface device transmits information the OLT.

25 Claims, 6 Drawing Sheets

(56) References Cited

U.S. PATENT DOCUMENTS

| | | | |
|---|---|---|---|
| 2010/0098413 A1* | 4/2010 | Li et al. | 398/38 |
| 2010/0098433 A1 | 4/2010 | Boyd et al. | |
| 2010/0183304 A1* | 7/2010 | Spector | 398/66 |
| 2012/0008953 A1* | 1/2012 | Lu et al. | 398/66 |

OTHER PUBLICATIONS

Effenberger et al., "Time of day Distribution over E-PON," Huawei Technologies Co., LTD., Mar. 2009, 16 pp.

Papakonstantinou et al., "Passive Optical Networks for the Distribution of Timed Signals in Particle Physics Experiments," TWEPP-09: Topical Workshop on Electronic for Particle Physics, Paris, France, Sep. 21-25, 2009, 352-356 pp, 5 pp.

ITU-T: "Gigabit-capable Passive Optical Networks (G-PON): Transmission convergence layer specification," ITU-T, 6.984.3, Amendment 2, Nov. 2009, 14 pp.

Prosecution History from U.S. Pat. No. 8,630,546, dated May 8, 2013 through Sep. 10, 2013, 44 pp.

* cited by examiner

NETWORK INTERFACE DEVICE SYNCHRONIZATION

This application is a Continuation of U.S. application Ser. No. 12/916,880 filed on Nov. 1, 2010, the entire content of which is incorporated herein by reference.

TECHNICAL FIELD

This disclosure relates to optical networks and, more particularly, to techniques for synchronizing a clock in a network interface device in an optical network.

BACKGROUND

Optical networks are used to deliver voice, data and video services to multiple network subscribers using one or more optical fibers. The optical networks deployed to deliver the voice, data and video services may be either passive or active. In a passive optical network (PON), for example, passive optical splitters and combiners enable multiple subscribers to share the same optical fiber. Thus, the PON functions as a point-to-multipoint optical network. A PON may conform to any of a variety of PON standards, such as broadband PON (BPON) (ITU G983), gigabit-capable PON (GPON) (ITU G984), or gigabit-capable Ethernet PON (GEPON or EPON) (IEEE 802.3). In an active optical network, some sort of electrically powered equipment, such as a switch, router, or multiplexer, distributes the signal to the subscriber to which the signal is destined. Thus, an active optical network, such as an active Ethernet (AE) optical network (IEEE 802.3ah), may operate as a point-to-point network.

When optical fiber extends to a premise where one or more subscriber devices are located, the service is commonly referred to as Fiber to the Premises (FTTP) or Fiber to the Home (FTTH). In FTTP/FTTH services, a network interface device, such as an optical network unit (ONU), terminates an optical fiber of the optical network, and delivers the signals on the optical fiber to subscriber devices to provide FTTP services. Subscriber devices may include, for example, televisions, set-top boxes, telephones, computers, or other network client devices. The ONU also receives signals from subscriber devices, and transmits the signals upstream via the optical network. In this manner, the ONU can support a wide variety of services, including voice, video and data services, over the optical network.

SUMMARY

In general, this disclosure describes techniques for synchronizing a time of day (TOD) clock in a network interface device, such as an optical network unit (ONU), with a TOD clock in an optical line terminal (OLT). As used herein, synchronization between the TOD clock in the network interface device and the TOD clock in the OLT may indicate that the TOD clock in the network interface device and the TOD clock in the OLT are substantially phase locked. Phase lock may indicate that the TOD clock in the OLT and the TOD clock in the network interface device increment their respective clocks starting from substantially the same time, e.g., within one microsecond (us). In other words, when synchronized the TOD clock in the network interface device and the TOD clock in the OLT may be at substantially the same time, e.g., within one microsecond.

As described in more detail below, to synchronize the TOD clock on the network interface device with the TOD clock on the OLT, the network interface device may determine a time when it should receive a start of frame pulse from the OLT. The network interface device may determine the time when it should receive a start of frame pulse from the OLT based on instances when the network interface device transmits information. In some non-limiting implementations, the network interface device may also determine an identifier of a frame that may be used to synchronize the TOD clock on the network interface device with the TOD clock on the OLT. The identifier of the frame may be a numerical identifier.

In one example, aspects of this disclosure are directed to a method comprising monitoring, with a network interface device, one or more instances when the network interface device transmits information to an optical line terminal (OLT) within a current frame, and determining, with the network interface device, a time when a next frame should be received by the network interface device based on the monitored one or more instances when the network interface device transmits information to the OLT.

In another example, aspects of this disclosure are directed to an optical network comprising a network interface device that includes a processor to transmit information to an optical line terminal (OLT), and a synchronization module configured to monitor one or more instances when the network interface device transmits information to the OLT within a current frame, and determine a time when a next frame should be received by the network interface device based on the monitored one or more instances when the network interface device transmits information to the OLT.

In another example, aspects of this disclosure are directed to an optical network comprising means for monitoring one or more instances when a network interface device transmits information to an optical line terminal (OLT) within a current frame, and means for determining a time when a next frame should be received by the network interface device based on the monitored one or more instances when the network interface device transmits information to the OLT.

In another example, aspects of this disclosure are directed to a computer-readable storage medium comprising instructions that cause one or more processors to monitor one or more instances when a network interface device transmits information to an optical line terminal (OLT) within a current frame, and determine a time when a next frame should be received by the network interface device based on the monitored one or more instances when the network interface device transmits information to the OLT.

The details of one or more aspects of the disclosure are set forth in the accompanying drawings and the description below. Other features, objects, and advantages of the disclosure will be apparent from the description and drawings, and from the claims.

DETAILED DESCRIPTION

Figure 1:
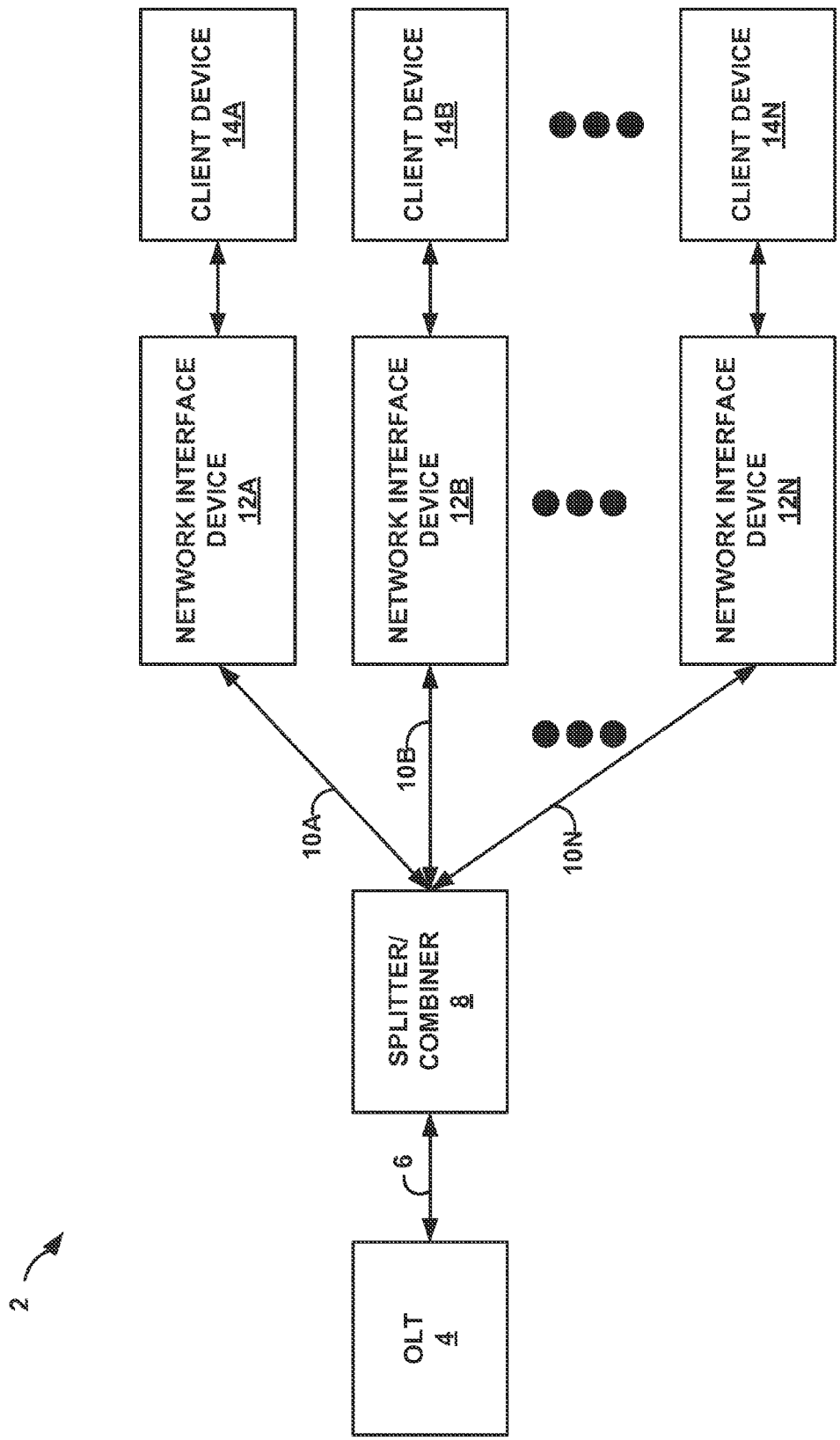
FIG. 1 is a block diagram illustrating an example optical network.

An optical network, such as a passive optical network (PON), may require various network elements of the PON to distribute phase information. The phase information may include propagation delay through the PON. The phase information may allow the network elements to transmit data at appropriate instances. For example, mobile backhaul applications, such as applications for wireless voice and data transmissions, may require phase information to be distributed over an Ethernet PON (EPON) or giga-bit PON (GPON). As one example, the various network elements of the PON may include a network interface device, such as an optical network unit (ONU), and an optical line terminal (OLT). A mobile backhaul application may require distribution of phase information between the OLT and the network interface device.

In some examples, phase information may be distributed to network interface devices and the OLT using a precision time protocol (PTP). PTP is described in greater detail by IEEE 1588-2008, entitled "Standard for a Precision Clock Synchronization Protocol for Networked Measurement and Control Systems," which is hereby incorporated by reference in its entirety. PTP utilizes a transparent clock protocol which allows the network interface device and the OLT to account for their respective ingress and egress delays in order to remove any asymmetry that may exist in the PON. Asymmetry in a PON may refer to the asymmetry in the propagation time from the OLT to the network interface device and the propagation time from the network interface device to the OLT.

Due to the high degree of asymmetry in PON systems, a time of day (TOD) clock in the network interface device may need to be synchronized, e.g., phase locked, with a TOD clock in the OLT to accurately distribute phase information. For instance, the TOD clock in the OLT and the TOD clock in the network interface device may need to be based on the same time of day (TOD) information. As described above, synchronization between the OLT TOD clock and the network interface device TOD clock may indicate that the OLT clock and the network interface clock are virtually phased locked such that the OLT TOD clock and the network interface device TOD clock increment starting from substantially the same time. For example, the OLT TOD clock and the network interface device TOD clock may be required to be synchronized to within ±1 microsecond (us) such that TOD clock on the OLT is within ±1 us of TOD clock within the network interface device.

To address the synchronization requirements, the Full Service Access Network (FSAN) standards body, of the International Telecommunications Union (ITU), provided a specification (G.984.3 Am. 2), which is hereby incorporated by reference in its entirety. In accordance with G.984.3 Am. 2, to synchronize the TOD clock in the network interface device with the TOD clock in the OLT, the OLT may transmit time of day (TOD) information to the network interface device. The TOD information may indicate the time of day at the OLT at a particular frame identified by a numerical identifier. The time of day at the OLT may indicate the amount of time that has elapsed at the OLT, and in some examples, may be reset every 37 hours. Also, in accordance with G.984.3 Am. 2, the OLT may transmit the identifier, e.g., a numerical identifier, for the frame that is associated with the TOD information. The numerical identifier may be referred to as a super frame count.

For example, the OLT may indicate that, at frame 1000, the time of day is 10 seconds, 50 nanoseconds. In this example, the super frame count is 1000 and the TOD information is 10 seconds, 50 nanoseconds. In this example, the OLT may transmit 1000, as the super frame count, and 10 seconds, 50 nanoseconds, as the TOD information to the network interface device. Frame 1000 may be associated with the TOD information. In other words, at frame 1000, the time of day, as indicated by the TOD information, is 10 seconds, 50 nanoseconds.

In accordance with G.984.3 Am. 2, the network interface device may modify the received TOD information to account for delays at the network interface device. For example, the total delay for the TOD information to reach the network interface device may be 100 nanoseconds. In this example, the network interface device may include the delay in receiving the TOD information to reflect the actual time of day at the network interface device. For instance, keeping with the previous example, the network interface device may receive the TOD information as 10 seconds, 50 nanoseconds, and may add 100 nanoseconds to the received TOD information because 100 nanoseconds will elapse before the network interface device receives frame 1000. In this example, the TOD information at the network interface device is 10 seconds, 150 nanoseconds.

The network interface device may temporarily store the modified TOD information until it receives the associated frame. For example, the network interface device may temporarily store 10 seconds, 150 nanoseconds until it receives frame 1000. The network interface device may load the modified TOD information when it receives the associated frame as identified by its numerical identifier. As described above, the TOD information may be the time of day at a particular frame identified by its numerical identifier. In some examples, the network interface device may load the modified TOD information within a 64 bit register of a processor on the network interface device. The first 32 bits of the 64-bit register may be configured to store the seconds of the TOD information, and the second 32 bits of the 64-bit register may be configured to store the nanoseconds of the TOD information.

For instance, in the previous example, the received TOD information is 10 seconds, 50 nanoseconds at frame 1000. The modified TOD information is 10 seconds, 150 nanoseconds, which accounts for the delays in receiving frame 1000. When the network interface device receives frame 1000, as identified by its numerical identifier, the network interface device may load the modified TOD information, e.g., 10 seconds, 150 nanoseconds, into the 64 bit register of the processor. The processor may store 10 seconds in the first 32 bits of the 64 bit register and store 150 nanoseconds in the second 32 bits of the 64 bit register.

After the processor loads the modified TOD information, the TOD clock on the network interface device may increment based on the stored modified TOD information. Because the TOD information, provided by the OLT, is based on the clock on the OLT, the TOD clock in the network interface device may be synchronized with the TOD clock on the OLT. For example, after the processor loads the modified TOD information, the TOD clock in the network interface device and the TOD clock in the OLT may indicate the same time of day. In some examples, for every one second increment in the TOD clock on the OLT, the TOD clock on the network interface device may increment at one second at the exact same time.

However, a processor on a network interface device that was developed before G.984.3 Am. 2 may not be configured to load the TOD information. Furthermore, the processor, that was developed before the G.984.3 Am. 2, may not be configured to load the TOD information at the exact time specified by the OLT. For example, the processor may not be configured to load the TOD information when the network interface device receives the associated frame. For instance, keeping with the previous example, the processor may not be configured to load the modified TOD information when the network interface device receives frame 1000.

Moreover, information for when the processor received the frame associated with the TOD information may not accessible outside the processor. For example, keeping with the previous example, the network interface device may not know when it received frame 1000 because this information may not be accessible outside the processor. In some examples, software, executing on the network interface device, may be able to determine when the network interface device received the frame associated with the TOD information. However, the software may be incapable of loading the TOD information with sufficient precision so that the network interface device TOD clock and the OLT TOD clock are synchronized to within the ±1 us synchronization requirement.

Although the processor of the network interface device may not be capable of synchronizing the TOD clock on the network interface device with the TOD clock on the OLT, this disclosure describes example techniques to synchronize the TOD clock on the network interface device with the TOD clock on the OLT. Example techniques of this disclosure may determine the time when to load the TOD information by utilizing circuitry that is external to the processor on the network interface device. For purposes of clarity, the circuitry that may determine the time when to load the TOD information is described as being external to the processor. However, in some examples, the circuitry may be internal to the processor. Also, example techniques of this disclosure may determine when the frame that is associated with the TOD information should be received by the network interface device by utilizing the circuitry that is external to the processor on the network interface device. In this manner, the circuitry that is external to the processor may be configured to load the TOD information at the exact moment defined by the OLT to synchronize the TOD clock on the network interface device with the TOD clock on the OLT.

To determine when to load the TOD information, the circuitry external to the processor may first determine the time when the network interface device should receive a next downstream frame. The circuitry external to the processor may also determine the numerical identifier for the next downstream frame. After the circuitry external to processor determines when the next frame should be received and the numerical identifier for the next frame, the circuitry external to the processor may determine when it will receive the frame that is associated with the TOD information. The circuitry external to the processor may then load the TOD information when it receives the frame associated with the TOD information.

As one example, provided for illustration purposes, assume that the OLT indicated that at frame 500 the TOD information is 100 seconds, 0 nanoseconds. Assume that the total delay for the frame to reach the network interface device is 750 nanoseconds, resulting in a modified TOD information of 100 seconds, 750 nanoseconds. Also, assume that the circuitry external to the processor determined that the network interface device should receive the next frame after 50 us and that the numerical identifier for the frame is 400, utilizing techniques described in more detail below. Also, assume that the temporal length for each frame is 125 us.

In this example, the circuitry external to the processor would wait 50 microseconds (us) plus 12500 us and then load the modified TOD information, e.g., 100 seconds, 750 nanoseconds, in a TOD storage location. In this example, 50 us represents the amount of time before the network interface device receives the next frame, e.g., frame 400, and 12500 us plus 50 us represents the total time before network interface device receives the frame associated with the TOD information, e.g., frame 500. The value of 12500 us may be determined by subtracting 400 from 500 and multiplying the result by 125 us. As described above, the numerical identifier for the next frame is 400 and the numerical identifier for the frame associated with the TOD information is 500. Accordingly, by subtracting 400 from 500 and multiplying the result by 125 us, which is the temporal length of each frame, the circuitry external to the processor may determine the amount of time it will take the network interface device to receive frame 500, after it receives frame 400. In this example, network interface device may receive frame 400 after 50 us.

As described above, the circuitry external to the processor may determine when the next frame should be received by the network interface device. As described in more detail below, the circuitry external to the processor may determine when the next frame should be received by monitoring instances when the network interface device transmits information. The instances when the network interface device transmits information may be defined by the OLT and therefore may be synchronized with the clock on the OLT.

The instances when the network interface device transmits information may function as a trigger that causes the circuitry external to the processor to determine when the network interface device should receive the next frame. The instances when the network interface device transmits information may also function as a trigger that causes the circuitry external to the processor to determine the numerical identifier for the next frame. Based on when the next frame should be received and the numerical identifier for the next frame, the circuitry external to the processor may determine the precise time when to load the modified TOD information, thereby synchronizing the TOD clock on the network interface device with the TOD clock on the OLT. In this manner, one or more network interface devices may be configured to be compliant with G.984.3 Am. 2, even when the network interface devices were not developed to be in compliance with G.984.3 Am. 2. Moreover, even if it is not necessary for the network interface devices to be compliant with G.984.3 Am. 2, certain techniques of this disclosure may still allow the network interface device to synchronize its TOD clock to the TOD clock on the OLT.

FIG. 1 is a block diagram illustrating an example optical network 2. Optical network 2 may be a passive optical network (PON) or an active optical network. For example, optical network 2 may be a giga-bit PON (GPON), an Ethernet PON (EPON), or other types of PONs. As another example, optical network 2 may be an Active Ethernet optical network, or other types of active optical networks. Optical network 2 includes an optical line terminal (OLT) 4, such as an optical line terminal (OLT), fiber link 6, optical splitter/combiner 8, fiber link 10A-10N (collectively referred to as fiber links 10), network interface device 12A-12N (collectively referred to as network interface devices 12), and client device 14A-14N (collectively referred to as client devices 14). For purposes of illustration, FIG. 1 illustrates three network interface devices 12 and three client devices 14. However, there may be more or fewer than three network interface devices 12 and client devices 14, depending on network size, design and implementation.

OLT 4 may be configured to provide various services to client devices 14. For example, OLT 4 may be configured to transmit video, voice, and data information over optical network 2 to client devices 14 via respective network interface devices 12. Examples of network interface devices 12 may include optical network units (ONUs). OLT 4 may support delivery of voice and data services via a cable modem termination system (CMTS). OLT 4 may support delivery of video services from a video headend. OLT 4 may include circuitry to convert RF electrical signals carrying voice, data and video information to optical signals for downstream transmission via fiber links 6 and 10.

OLT 4 may transmit downstream information to and receive upstream information from network interface devices 12 via fiber link 6 coupled to splitter/combiner 8. Downstream information may be considered to be information transmitted by OLT 4 and received by network interface devices 12. Upstream information may be considered to be information transmitted by each one of network interface devices 12 and received by OLT 4. As illustrated in FIG. 1, optical fiber link 6 may couple OLT 4 to optical splitter/combiner 8. Optical splitter/combiner 8 may be coupled to each one of network interface devices 12 via respective optical fiber links 10.

In some examples, optical splitter/combiner 8 may be a passive splitter/combiner. A passive splitter/combiner may not need to be powered. For downstream transmission, including voice, video, and data information from OLT 4, optical splitter/combiner 8 receives the downstream information and splits the downstream information for downstream transmission to network interface devices 12 via respective fiber links 10. For upstream information, including voice and data information from each one of network interface devices 12, optical splitter/combiner 8 receives upstream information from network interface devices 12 via respective fiber links 10 and combines the upstream information for transmission to OLT 4.

In some alternate examples, optical splitter/combiner 8 may not be a passive splitter/combiner, but rather an active splitter/combiner. In these examples, optical splitter/combiner 8 may be powered locally. In these examples, optical splitter/combiner 8 may function as a switch, router, multiplexer, and the like.

Network interface devices 12 may receive and transmit information via respective fiber links 10. Also, OLT 4 may receive and transmit information via fiber link 6. To differentiate between transmission and reception, each one of network interface devices 12 may be configured to transmit voice and data information with an optical signal with a wavelength of 1310 nanometer (nm), receive voice and data information with an optical signal with a wavelength of 1490 nm, and receive video information with an optical signal with a wavelength of 1550 nm. OLT 4 may be configured to receive voice and data information with an optical signal with a wavelength of 1310 nm, transmit voice and data information with an optical signal with a wavelength of 1490 nm, and transmit video information with an optical signal with a wavelength of 1550 nm.

The specific transmit and receive wavelengths indicated above are provided for illustration purposes only. In different examples, network interface devices 12 and OLT 4 may be configured to transmit and receive information with optical signals at different wavelengths than those provided above. However, the transmission and reception wavelengths of the optical signals should be different.

Each one of network interface devices 12 may be configured to transmit upstream information according to time division multiple access (TDMA) techniques. For instance, OLT 4 may grant or assign to each one of client devices 14 certain slots during which the client devices may transmit upstream information. Each one of network interface devices 12 may transmit information to OLT 4 based on the slots assigned to each one of the respective client devices 14. The slot for each one network interface devices 12 may be different. In this manner, each one of network interface devices 12 may transmit information without collision of information from two or more different network interface devices 12 at splitter/combiner 8. Collision of information may occur if splitter/combiner 8 receives upstream information from two or more network interface devices 12 at the same time.

As one example of the TDMA techniques, when one of network interface devices 12, e.g., network interface device 12A, is powered on for the first time, OLT 4 may perform an auto-ranging process, as is well known in the art. For instance, during the auto-ranging process, OLT 4 may calculate the total propagation delay, e.g., the total time it takes to transmit information to network interface device 12A and receive information from network interface device 12A. OLT 4 may perform similar auto-ranging process on each one of network interface devices 12.

After the auto-ranging process, OLT 4 may calculate an equalization delay for each one of network interface devices 12, utilizing techniques well known in the art. The equalization delay equalizes the propagation delay of each one of network interface devices 12, relative to the other network interface devices 12. OLT 4 may transmit the equalization delay to each one of network interface devices 12 utilizing a physical layer operations and maintenance (PLOAM) message or utilizing an ONU management control interface (OMCI) message.

Once all the equalization delays are calculated and transmitted to network interface devices 12, OLT 4 may grant the slots during which each one of network interface devices 12 should transmit data. OLT 4 may transmit a bandwidth map to each one of network interface devices 12 indicating the slots during which each one network interface devices 12 should transmit data. OLT 4 may transmit the bandwidth map utilizing a PLOAM or OMCI message, or other message. In some examples, the bandwidth map may include both a identifier that identifies the frame and a byte range, within the frame, during which each one of network interface devices 12 should transmit information. The identifier may be a numerical identifier; however, aspects of this disclosure should not be considered limited to numerical identifiers. For purposes of illustration, aspects of this disclosure are described with examples where there identifier is a numerical identifier.

The frame and the byte range may define the slot when each one network interface devices 12 transmits information. The numerical identifier for the frame may be referred to as the super-frame count for the frame, and each network interface devices 12 may be configured to transmit information during the frame identified by its super-frame count. For example, OLT 4 may specify a particular frame, e.g., with the numerical identifier of 15, and byte range within frame 15, e.g., bytes 2000-5000, for network interface device 12A. Network interface device 12A may then transmit upstream information to OLT 4 at frame 15 between bytes 2000-5000. It should be noted that the numerical identifier for the frame within which network interface device 12A may transmit upstream information should not be confused with the numerical identifier for the frame associated with the TOD information, as described in more detail below.

Furthermore, OLT 4 may transmit the TOD information to each one of network interface devices 12. OLT 4 may transmit the TOD information utilizing a PLOAM or OMCI message, or other message. The PLOAM or OMCI message may also include a numerical identifier for a frame associated with the TOD information.

Each one of network interface devices 12 may modify the received TOD information to account for delays in receiving the TOD information. The delays in receiving the TOD information may be based in part on the equalization delay. Each one of network interface devices 12 may temporarily store the modified TOD information, and load the modified TOD information within storage locations when each one of network interface devices 12 receive the frame associated with the TOD information.

The TOD information may indicate the time of day at OLT 4 when the frame associated with the TOD information should be received by the network interface device. The time of day at OLT 4 may be an indication of the amount of time elapsed at OLT 4, starting at 0 seconds and resetting after 37 hours. For example, after every 37 hours, the time of day at OLT 4 may be reset to zero seconds, and the clock within OLT 4 may begin counting the amount of elapsed time until the elapsed time reaches 37 hours. After 37 hours, the OLT 4 may reset the TOD information to 0 seconds. Resetting the TOD information every 37 hours is provided for illustration purposes and should not be considered as limiting.

As described above, network interface devices 12 may need to load the modified TOD information within respective storage locations, of network interface devices 12, at precise times in accordance with G.984.3 Am. 2. The respective storage locations may be registers within a processor, storage devices, or other storage locations within each one of network interface devices 12. These precise times when network interface devices 12 should load the modified TOD information may be defined based on when the frame associated with the TOD information should be received by network interface devices 12. The frame that is associated with the TOD information may be identified by its numerical identifier.

When each one of network interface devices 12 receives the frame associated with the TOD information, each one of network interface devices 12 may load the modified TOD information within the storage location, which may be registers of processors on network interface devices 12. After each one of network interface devices 12 load the modified TOD information, the TOD clock on each one of network interface devices 12 may be synchronized with the TOD clock on OLT 4 because each TOD clock may increment starting from substantially the same time.

However, as described above, some processors on network interface devices 12, such as processors developed before G.984.3 Am. 2, may not be configured to load the received TOD information based on when the frame, associated with the TOD information should be received. For example, a processor on network interface device 12A may not be configured to synchronize the TOD clock on network interface device 12A, in accordance with G.984.3 Am. 2. Furthermore, the processor may not indicate when network interface device 12A received the frame associated with the TOD information.

Using certain techniques of this disclosure, each one of network interface devices 12 may include circuitry that in some non-limiting examples is external to the processor on each one of network interface devices 12. The circuitry may be configured to determine when a next frame should be received by network interface devices 12, and in some non-limiting examples, may also determine the numerical identifier for the next frame. Furthermore, the circuitry may determine the time when the TOD information should be loaded in the storage location based on the when the next frame should be received by network interface devices 12 and, in some non-limiting examples, the numerical identifier for the next frame. The circuitry may also load the TOD information, at the determined time, within registers formed within the circuitry. In this manner, network interface devices 12 that include processors developed before G.984.3 Am. 2 may be configured to be in compliance with G.984.3 Am. 2.

The circuitry may be formed in a synchronization module. The synchronization module may be another processor. In some examples, each synchronization module may be external to each one of network interface devices 12. In some alternate examples, each synchronization module may be formed on each one of network interface devices 12, but may be external to the processor already formed on network interface devices 12. In some other alternate examples, the synchronization module may be formed within the processor.

The synchronization module may be configured to determine when a next frame should be received by network interface devices 12 and, in some examples, the identifier, e.g., the numerical identifier, for the next frame. To determine when the next frame should be received, the synchronization module may monitor one or more instances when respective network interface devices 12 transmit information. Based on when a network interface device 12 transmits information, the synchronization module may perform certain calculations to determine when the next frame should be received, as described in more detail. Also, in some examples, the synchronization module may also determine the numerical identifier for the next frame. The numerical identifier for the next frame may be referred to as its downstream framing information. The synchronization module may utilize the determined time when the next frame should received, and in some instances, both the determined time when the next frame should be received and the determined downstream framing information for the next frame, to determine the precise time when the synchronization module should load the modified TOD information. As described above, after loading the modified TOD information, the TOD clock on each one of network interface devices 12 may be synchronized to the TOD clock on OLT 4.

To monitor the one or more instances when each one of network interface devices 12 transmits data, the respective synchronization modules may monitor a burst-enable signal to a laser driver, monitor a current through a laser, or monitor current through a photo-diode coupled to the laser. Each one of network interface devices 12 may include a laser driver coupled to a laser to transmit information. In some examples, the laser driver may be formed within a transceiver module. To transmit information during an assigned slot, a processor on each one of network interface devices 12 transmits a burst-enable signal to the laser driver. In response, the laser driver enables the laser for optical transmission of the information from each one of network interface devices 12 to OLT 4. As described above, because OLT 4 may assign the time slots to each one of network interface devices 12 within which each one of network interface devices 12 should transmit data, the instances when each one of network interface devices 12 transmit data may be based on instances defined by OLT 4.

For example, the synchronization module of network interface device 12A may monitor the burst-enable signal transmitted from the processor to the laser driver, both of network interface device 12A, to monitor the instances when network interface device 12A transmits information. As another example, the synchronization module of network interface device 12A may monitor the current through the laser coupled to network interface device 12A to determine when the laser is enabled in order to monitor the instances when network interface device 12A transmits information. As yet another example, in some instances, the synchronization module of network interface device 12A may monitor the current through a photo-diode that is coupled to the laser. The photo-diode that is coupled to the laser is different than the photo-diode on network interface device 12A that receives optical signals from OLT 4, as described in more detail with respect to FIG. 2. The synchronization modules of network interface device 12B-12N may function in a substantially similar manner.

The instances when each one of network interface devices 12 transmits information may function as a trigger that causes a synchronization module to determine when each one of network interface devices 12 should receive the next frame from OLT 4. As described in more detail below with respect to FIG. 2, the determination of when each one of network interface devices 12 should receive a frame may be based on a temporal length of a frame, the equalization delay of network interface devices 12, the response time of network interface devices 12, and the start time of when each one of network interface devices 12 may transmit the information, within the assigned slot. As described above, the determination of when network interface devices 12 should receive the next frame may determine when the synchronization modules should load the received TOD information in storage locations. Also, as described above, a synchronization module may synchronize a TOD clock on a respective one of network interface devices 12 with TOD a clock on OLT 4 based on the TOD information.

Furthermore, in other example implementations, the synchronization module may also be configured, if desired, to determine the downstream framing information for the next frame. It may not be necessary to determine the downstream framing information in every example. For example, if it is not necessary for network interface devices 12 to be compliant with G.984.3 Am. 2, it may not be necessary to determine the downstream framing information. The downstream framing information may include a numerical identifier of the frame that is transmitted by OLT 4. The numerical identifier of the frame may be referred to as a super frame count. The synchronization module may determine the super frame count of the next frame that should be received by each one of network interface devices 12 based at least on the equalization delay and response time, as described in more detail below.

Based on the determined time at which a next frame should be received by each one of network interface devices 12, and in some non-limiting examples, the downstream framing information for the next frame, each one of the synchronization modules may determine when the frame associated with the TOD information will be received by respective network interface devices 12. In some examples, the synchronization modules may be configured to modify the received TOD information to account for the delay in receiving the frame associated with the TOD information. In some other examples, the processor may be configured to modify the received TOD information to account for the delay in receiving the frame associated with the TOD information. In these examples, the processor may transmit the modified TOD information to the synchronization module. The synchronization module may then load the modified TOD information based on the determined time when the frame associated with the TOD information will be received by respective network interface devices 12 to synchronize the TOD clock on each one of network interface devices 12 with the TOD clock on OLT 4.

In accordance with techniques of this disclosure, each synchronization module may allow respective network interface devices 12 to be compliant with G.984.3 Am. 2, even if processors on network interface devices 12 were developed prior to G.984.3 Am. 2. That is, G.984.3 Am. 2 may require each one of network interface devices 12 to synchronize their respective TOD clocks based on the modified TOD information as well as the downstream framing information, e.g., the super-frame count. Using certain techniques of this disclosure, the synchronization module may determine the precise time when to load the modified TOD information. Based on when the TOD information is loaded, each synchronization module may then synchronize the TOD clock on respective network interface devices 12 with the TOD clock on OLT 4. In this manner, each synchronization module may allow respective network interface devices 12 to be compliant with the G.984.3 Am. 2 standard, even if network interface devices 12 were developed prior to the G.984.3 Am. 2 standard.

Figure 2:
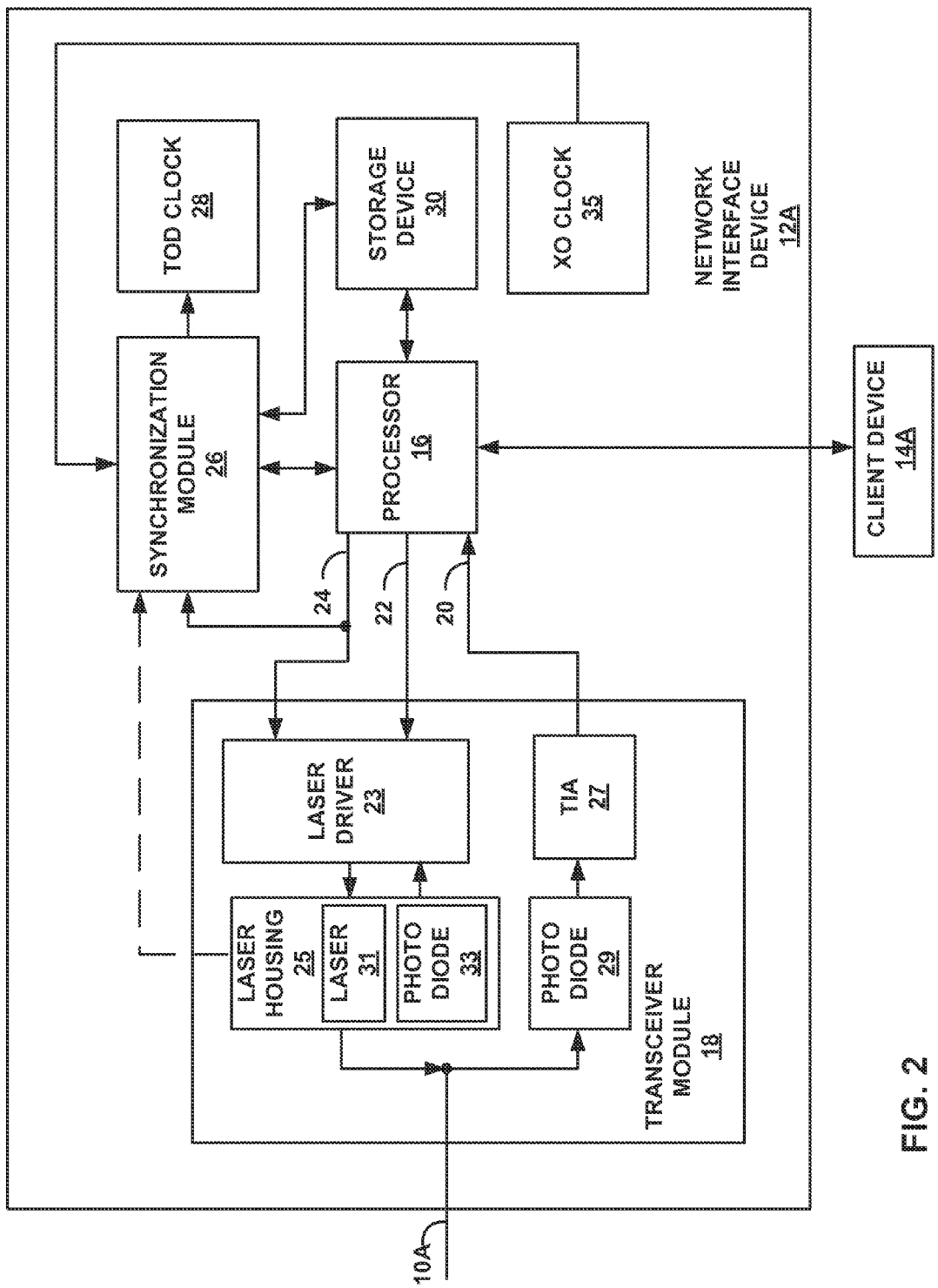
FIG. 2 is a block diagram illustrating an example network interface device of FIG. 1, in more detail.

FIG. 2 is a block diagram illustrating an example network interface device, of FIG. 1, in more detail. As illustrated in FIG. 2, network interface device 12A may include processor 16, transceiver module 18, synchronization module 26, time of day (TOD) clock 28, and storage device 30. In some examples, network interface device 12A may also include oscillator (XO) clock 35. However, XO clock 35 is not required in every example of network interface device 12A. Network interface device 12A may include additional components that are not shown for purposes of clarity. Network interface devices 12B-12N may include components similar to network interface device 12A.

Although synchronization module 26 is shown as being a part of network interface device 12A, in some examples, synchronization module 26 may be formed external to network interface device 12A. Also, although synchronization module 26 is shown as being external to processor 16, in some examples, synchronization module 26 may be formed within processor 16.

Moreover, although TOD clock 28 is illustrated as a separate component, in some examples, TOD clock 28 may be formed within processor 16, synchronization module 26, or within storage device 30. As described in more detail below, TOD clock 28 may store the time of day (TOD) information transmitted by OLT 4, or the modified TOD information based on the TOD information transmitted by OLT 4. In some examples, TOD clock 28 may be 64-bit register. The first 32 bits may be utilized to store the seconds of the TOD information, and the second 32 bits may be utilized to store the nanoseconds of the TOD information. The stored TOD information within TOD clock 28 may be incremented periodically from a clock generated by processor 16. In some alternate examples, the stored TOD information within TOD clock 28 may be incremented periodically from a clock generated by XO clock 35, in examples of network interface device 12A that include XO clock 35.

For instance, synchronization module 26 may receive the clock generated by processor 16, in one example, or the clock generated by XO clock 35, in an alternate example. Based on the received clock, synchronization module 26 may increment TOD clock 28. For example, synchronization module 26 may increment the 64-bit register within TOD clock 28.

Examples of processor 16 and synchronization module 26 include, but are not limited to, an application specific standard product (ASSP), a digital signal processor (DSP), general purpose microprocessor, application specific integrated circuit (ASIC), field programmable logic array (FPGA), or other equivalent integrated or discrete logic circuitry. Storage device 30 may comprise one or more computer-readable storage media. Examples of storage device 30 include, but are not limited to, a random access memory (RAM), a read only memory (ROM), an electrically erasable programmable read-only memory (EEPROM), CD-ROM or other optical disk storage, magnetic disk storage, or other magnetic storage devices, flash memory, or any other medium that can be used to carry or store desired program code in the form of instructions or data structures and that can be accessed by a computer or a processor.

In some instances, storage device 30 may include instructions that cause processor 16 and/or synchronization module 26 to perform the functions ascribed to processor 16 and synchronization module 26 in this disclosure. Accordingly, storage device 30 may be a computer-readable storage medium comprising instructions that cause one or more processors, e.g., processor 16 and/or synchronization module 26, to perform various functions.

Storage device 30 may, in some examples, be considered as a non-transitory storage medium. The term "non-transitory" may indicate that the storage medium is not embodied in a carrier wave or a propagated signal. However, the term "non-transitory" should not be interpreted to mean that storage device 30 is non-movable. As one example, storage device 30 may be removed from network interface device 12A, and moved to another device. As another example, a storage device, substantially similar to storage device 30, may be inserted into network interface device 12A. In certain examples, a non-transitory storage medium may store data that can, over time, change (e.g., in RAM).

Transceiver module 18 may be coupled to fiber link 10A. Transceiver module 18 may be configured to receive downstream information from OLT 4 and transmit upstream information to OLT 4 via fiber link 10A. Transceiver module 18 may include laser driver 23, laser housing 25, trans-impedance amplifier (TIA) 27, and photodiode 29. Laser housing 25 may include laser 31 and photo-diode 33.

Photodiode 29 may receive optical signals from OLT 4 and convert the optical signals to current signals. TIA 27 may convert the current signals to voltage signals, and provide the voltage signals to processor 16, via data line 20. For example, OLT 4 may transmit a bandwidth map to network interface device 12A in a PLOAM or OMCI message. As another example, OLT 4 may transmit the TOD information at an associated frame and the numerical identifier for the frame to network interface device 12A in a PLOAM or OMCI message. As yet another example, OLT 4 may transmit the equalization delay of network interface device 12A in a PLOAM or OMCI message. Photodiode 29 may receive the optical signals, convert the optical signals to current signals, and transmit the current signals to TIA 27 for conversion to voltage signals.

Based on the bandwidth map, processor 16 may transmit information to OLT 4 at the times assigned to network interface device 12A via laser 31. For example, the bandwidth map may define a frame, identified by its numerical identifier, and byte range within which network interface device 12A should transmit information. For the example, the bandwidth map may indicate that network interface device 12A should transmit information at frame 1500 within bytes 5000-8000.

As another example, photodiode 29 may receive voice, data, and video information from OLT 4 via fiber link 10A. Photodiode 29 may convert the optical signals that represent the information to current signals. TIA 27 may convert the current signals that represent the information to voltage signals. TIA 27 may transmit the voltage signals that represent the voice, data, and video information to processor 16, via data line 20. Processor 16 may then transmit the voice, data, and video information to client device 14A.

Laser driver 23 may receive information to be transmitted by network interface device 12A from processor 16, via data line 22. Laser driver 23 may also receive a burst-enable signal, via enable line 24, from processor 16 when network interface device 12A is scheduled to transmit data. Laser driver 23 may be coupled to laser 31. Laser driver 23 may modulate the current through laser 31 to transmit information from processor 16 to OLT 4. Photo-diode 33 may be a part of laser housing 25. Photo-diode 33 may receive a portion of the optical signal generated by laser 31 for correctly biasing laser 31. Photo-diode 33 may be part of an automatic power control (APC) loop. The APC loop may properly bias laser 31 to account for changes in the biasing point of laser 31, which may change over temperature.

In some of the examples of this disclosure, processor 16 may receive voice and data information from client device 14A during the scheduled instances when network interface device 12A is scheduled to transmit data. Processor 16 may transmit the received data to laser driver 23, via data line 22, and may also transmit a burst-enable signal, via enable line 24. Laser 31 may then transmit the voice and data information to OLT 4, via fiber link 10A, after laser driver 23 is enabled from the burst-enable signal. Photo-diode 33 may receive a portion of the optical signal transmitted by laser 31.

As described above, processor 16 may receive the TOD information for the associated frame, identified by its numerical identifier, from OLT 4. For example, processor 16 may receive information that indicates that, at frame 5000, the time of day is 500 seconds, 0 nanoseconds. In some examples, processor 16 may modify the received TOD information to account for delays in receiving the associated frame. For example, the time of day at OLT 4 may be 500 seconds, 0 nanoseconds when OLT 4 transmitted frame 5000. However, it may take 100 nanoseconds before network interface device 12A receives a frame, e.g., due to the propagation delay, equalization delay, and response time of network interface device 12A. Accordingly, in some examples, processor 16 may modify the received TOD information to account for the 100 nanosecond delay. In this example, processor 16 may modify the received TOD information to be 500 seconds, 100 nanoseconds. Processor 16 may then transmit the modified TOD information to synchronization module 26.

Synchronization module 26 may temporarily store the modified TOD information until network interface device 12A receives the frame associated with the TOD information. When network interface device 12A receives the frame associated with the TOD information, synchronization module 26 may load the modified TOD information within specific storage locations. For example, synchronization module 26 may load the modified TOD information within registers of TOD clock 28, within registers of processor 16, within its own registers, and/or within storage device 30, as a few non-limiting examples. The registers of processor 16, synchronization module 26, and TOD clock 28 may be 64-bit registers, although aspects of this disclosure are not so limited.

For purposes of illustration, aspects of this disclosure are described in the context of the TOD information being stored in TOD clock 28. However, as described above the TOD clock 28 may be formed within synchronization module 26, processor 16, or storage device 30.

In some alternate examples, processor 16 may transmit the received TOD information to synchronization module 26, and synchronization module 26 may be configured to modify the received TOD information. Synchronization module 26 may then load the modified TOD information when network interface device 12A receives the associated frame. For instance, keeping with the previous example, synchronization module 26 may modify the received TOD information to 500 seconds, 100 nanoseconds. When network interface device 12A receives frame 5000, synchronization module 26 may load the modified TOD information within TOD clock 28.

In some examples, processor 16 may not indicate when network interface device 12A received the associated frame. For example, processors, such as processor 16, which were developed prior to G984.3 Am. 2 may not be configured to indicate when they receive the frame associated with the TOD information. For instance, in the previous example, processor 16 may not be configured to indicate when network interface device 12A received frame 5000. Furthermore, processor 16 may not be configured to load the modified TOD information when it receives the frame associated with the TOD information.

In some of the example techniques of this disclosure, synchronization module 26 may be configured to determine when network interface device 12A should receive the frame associated with the TOD information. In other words, synchronization module 26 may be configured to determine the precise time when to load the modified TOD information in TOD clock 28.

Synchronization module 26 may determine the precise time when to load the modified TOD information based at least on instances when network interface device 12A transmits information. For example, synchronization module 26 may monitor one or more instances when network interface device 12A transmits information. As illustrated in FIG. 2, synchronization module 26 may monitor enable line 24. When processor 16 transmits a burst-enable signal, via enable line 24, the burst-enable signal may indicate that network interface device 12A is transmitting information. As another example, synchronization module 26 may monitor laser 31 of laser housing 25, as shown in the dashed line in FIG. 2. When current flows through laser 31, the current flowing through laser 31 may indicate that network interface device 12A is transmitting information. As yet another example, synchronization module 26 may monitor photo-diode 33 of laser housing 25, as shown in the dashed line in FIG. 2. When current flows through photo-diode 33, the current flowing through photo-diode 33 may indicate that network interface device 12A is transmitting information.

The instances when network interface device 12A transmits information may function as a trigger for synchronization module 26 to determine a time when network interface device 12A should receive the frame associated with the TOD information from OLT 4. To determine the time when network interface device 12A should receive the frame associated with the TOD information, synchronization module 26 may first determine the time when network interface device 12A should receive a next frame from OLT 4. It should be noted that the time when network interface device 12A receives the next frame may be different than the time when network interface device 12A receives the frame associated with the TOD information. In general, network interface device 12A may receive the frame associated with the TOD information at some time after network interface device 12A receives the next frame. However, aspects of this disclosure are not so limited.

The time when network interface device 12A should receive the next frame from OLT 4 may be based in part on the temporal length of a frame. The temporal length of a frame may be the temporal length between start-of-frame pulses. In addition to the temporal length of a frame, the time when network interface device 12A should receive the next frame from OLT 4 may be based in part on the equalization delay of network interface device 12A, the start time of when network interface device 12A transmits information, and the response time of network interface device 12A.

The temporal length of a frame may be defined by the standard for which optical network 2 is designed. For example, for the GPON standard, the temporal length of a frame may be approximately 125 us. In other words, the temporal length between start-of-frame pulses may be approximately 125 us. The temporal length of a frame may be based on the number of bits that are within a frame and the transmit rate of OLT 4. For example, if the transmit rate is 1 giga-bits per second (Gbps) and the number of bits within the frame is 125,000, then the temporal length of the frame is 125 us, e.g., $125,000/1*10^9$. In some examples, synchronization module 26 may be preprogrammed with the temporal length of the frame. In some other examples, processor 16 may transmit the temporal length of the frame to synchronization module 26.

As described above, OLT 4 may determine the equalization delay of network interface device 12A, for example, during the auto-ranging process, in order to assign network interface device 12A the instances when network interface device 12A should transmit information. OLT 4 may then transmit the equalization delay of network interface device 12A to processor 16. Processor 16 may transmit the equalization delay to synchronization module 26.

Furthermore, OLT 4 may transmit a bandwidth map to processor 16 that includes the byte range and the identifier, e.g., super-frame count, when network interface device 12A is scheduled to transmit data. OLT 4 may transmit the bandwidth map as a PLOAM or OMCI message. For example, network interface device 12A may be configured to transmit information during a certain byte range within a frame identified by its super-frame count. The bandwidth map may include the byte range and the super-frame count, within which network interface device 12A is scheduled to transmit information. For example, the byte range may be 2000 bytes to 5000 bytes, and the super-frame count may be 4000. Processor 16 may transmit the byte range and the super-frame count to synchronization module 26. In this example, network interface device 12A may transmit information within the frame identified by its numerical identifier. The frame within which network interface device 12A may transmit information may be referred to as a current frame.

It should be noted that the frame within which network interface device 12A transmits information, e.g., frame 4000 in this example, should not be confused with the frame associated with the TOD information. The identifier, e.g., super-frame count, for the frame associated with the TOD information may be different than the frame within which network interface device 12A transmits information, e.g., the current frame.

Based on the start of the byte range and the data rate at which network interface device 12A is configured to transmit data, synchronization module 26 may determine the start time of when network interface device 12A is scheduled to transmit data. For example, if the data rate at which network interface device 12A transmits data is 2.5 Gbps and the start of the byte range is 2000 bytes, then the start time of when network interface device 12A transmits information may be 6.4 us, e.g., $1\ second/(2.5*10^9\ bits)*8$ bits per byte*2000 bytes equals 6.4 us.

The response time of network interface device 12A may be the internal delay of network interface device 12A. The response time of network interface device 12A may be determined utilizing techniques known in the art. The response time of network interface device 12A may be stored in storage device 30 for access by synchronization module 26, as one example. As another example, processor 16 may transmit the response time to synchronization module 26.

To determine when network interface device 12A should receive the next frame, synchronization module 26 may sum the equalization delay and the response time of network interface device 12A to calculate a delay value. Synchronization module 26 may calculate the delay value when network interface device 12A transmits information, or may be calculated ahead of when network interface device 12A transmits information. Synchronization module 26 may monitor the one or more instances when network interface device 12A transmits information. As described above, synchronization module 26 may monitor the burst-enable signal to laser driver 23, the current through laser 31, or the current through photo-diode 33 to determine that network interface device 12A is transmitting information.

Synchronization module 26 divides the calculated delay value by the temporal length of a frame, and determines a remainder value of the division. Synchronization module 26 sums the remainder value with the start time value and then subtracts this sum from the temporal length of the frame. As described above, in some examples, the temporal length of the frame may be the time between start-of-frame pulses. The resulting value is the time when network interface device 12A may receive the subsequent frame, e.g., the TOD information.

Synchronization module 26 may implement the following equation to perform the above calculations. In equation (1) below, the temporal length of a frame is 125 us, for purposes of illustration. However, the techniques described throughout this disclosure are not so limited. In other example implementations, the temporal length of the frame may be different than 125 us.

Time of Next Frame=Burst_Enable+(125 us−(MOD(($EqD$+$Rsp$Time)/125 us)+SSTART)) (1)

In the preceding equation, Burst_Enable may indicate that network interface device 12A is about to transmit information, and may function as a trigger that causes synchronization module 26 to perform the subtraction, addition, and division functions in equation (1). The variable EqD refers to the equalization delay of network interface device 12A, and RspTime is the response time of network interface device 12A. SSTART is the start time value. The MOD function is the remainder function that calculates the remainder of EqD plus RspTime divided by the temporal length of the frame, e.g., 125 us.

In some non-limiting examples, for compliance with G.984.3 Am. 2, synchronization module 26 may also determine the downstream framing information for the next frame that should be received, e.g., the super-frame count for the next frame. In one example, to calculate the super-frame count for the next frame, synchronization module 26 sums the equalization delay and response time of network interface device 12A and then divides the summed value by the temporal length of the frame. The quotient of the division may be added with the super-frame count of the current frame and one to determine the super-frame count for the next frame, e.g., the downstream framing information for the next frame. The super-frame count of the current frame may be the super-frame count of the frame within which network interface device 12A transmits information to OLT 4.

Synchronization module 26 may implement equation (2) below to calculate the super-frame count for the subsequent frame. As above, in equation (2) the temporal length of a frame is 125 us, for purposes of illustration. However, aspects of this disclosure are not so limited. In other example implementations, the temporal length of the frame may be different than 125 us. Also, as above, EqD and RspTime is the equalization delay and response time of network interface device 12A, respectively.

Super-frame count for next frame=super-frame count for current frame+DIV(($EqD$+$Rsp$Time)/125 us)+1. (2)

For example, as described above, processor 16 may receive the bandwidth map for when network interface device 12A should transmit information. Processor 16 may transmit the bandwidth map to synchronization module 26. The bandwidth map may include a super-frame count and a byte range, within the frame, that indicates when network interface device 12A should transmit information. After determining the quotient of the division of equalization delay by the temporal length of the frame, synchronization module 26 may sum the quotient with the super-frame count and one to determine the super-frame count for the next frame that should be received by network interface device 12A.

The sum of the equalization delay and the response time of network interface device 12A may exceed the time between start-of-frame pulses, e.g., the temporal length of the frame. Because the sum of the equalization delay and the response time of network interface device 12A may exceed the temporal length of the frame, the sum of the equalization delay and the response time may be utilized for two different calculations. For example, the divisibility of the temporal length of the frame may be removed by utilizing the remainder and quotient values. For example, the quotient value is utilized to determine the downstream framing information. The remainder value is utilized to determine the TOD information.

Based on equations (1) and (2), synchronization module 26 may determine the precise time when network interface device 12A should receive the next frame and the numerical identifier, e.g., super-frame count, of the next frame. Synchronization module 26 may then determine the precise time when network interface device 12A should receive the frame associated with the TOD information. The precise time when network interface device 12A should receive the frame associated with the TOD information may be the precise time when synchronization module 26 loads the modified TOD information within TOD clock 28 to synchronize TOD clock 28 with the TOD clock on OLT 4.

The following is one example, utilizing illustrative values, of the manner in which synchronization module 26 may determine the precise time to load the modified TOD information, e.g., the precise time when network interface device 12A should receive the frame associated with the TOD information. The following example is provided for illustration purposes only and should not be considered as limiting.

OLT 4 may transmit the equalization delay of network interface device 12A, the TOD information, and the numerical identifier, e.g., the super-frame count, of the frame associated with the TOD information to network interface device 12A in a PLOAM or OMCI message. In this example, the equalization delay is 100 us, the TOD information is 100 seconds, 0 nanoseconds, and the numerical identifier, e.g., super-frame count, of the frame associated with the TOD information is frame 4200.

OLT 4 may also transmit the bandwidth map to network interface device 12A. The bandwidth map may indicate the byte range within a frame, identified by its numerical identifier, e.g., super-frame count. Network interface device 12A may transmit information to OLT 4 within the byte range of the frame identified by its super-frame count. In this example, the bandwidth map may indicate the byte range of 2000 bytes to 5000 bytes, and the super-frame count for the frame is frame 4000. Frame 4000 may be the current frame within which network interface device 12A should transmit information to OLT 4. The temporal length of the current frame may be 125 us.

Processor 16, of network interface device 12A, may receive equalization delay, the TOD information, and the super-frame count for the frame associated with the TOD information. Processor 16 may transmit the equalization delay and the super-frame count for the frame associated with the TOD information to synchronization module 26. In some examples, processor 16 may modify the received TOD information to account for delays in receiving the frame associated with the TOD information, and may transmit the modified TOD information to synchronization module 26. In alternate examples, processor 16 may transmit the TOD information to synchronization module 26, and synchronization module 26 may modify the TOD information to account for delays in receiving the frame associated with the TOD information. In this example, the modified TOD information may be 100 seconds, 500 nanoseconds.

Processor 16 may also determine the response time of network interface device 12A, which may be 300 us in this example. Processor 16 may transmit the response time to synchronization module 26. Also, processor 16 may transmit the super-frame count and the byte range for the frame within which network interface device 12A transmits information to synchronization module 26.

Accordingly, in this example, synchronization module 26 may receive 100 microseconds (us) as the equalization delay, 100 seconds, 500 nanoseconds as the modified TOD information, and frame 4200 as the super-count of the frame associated with the TOD information. Synchronization module 26 may also receive 300 us as the response time. Synchronization module 26 may also receive frame 4000 bytes 2000-5000 as the super-count and byte range of the frame within which network interface device 12A should transmit information to OLT 4. Based on the start of the byte range and the data rate at which network interface device 12A is configured to transmit data, synchronization module 26 may determine the start time of when network interface device 12A is scheduled to transmit data. For example, if the data rate at which network interface device 12A transmits data is 2.5 Gbps and the start of the byte range is 2000 bytes, then the start time of when network interface device 12A transmits information may be 6.4 us, e.g., 1 second/$(2.5*10^9$ bits$)*8$ bits per byte$*2000$ bytes equals 6.4 us.

Synchronization module 26 may determine the instances when network interface device 12A transmits information. For example, synchronization module 26 may monitor the burst-enable signal, current through laser 31, or current through photo-diode 33 to determine the instances when network interface device 12A transmits information. When synchronization module 26 determines network interface device 12A is transmitting information, synchronization module 26 may implement equations (1) and (2) using the values of this example.

For example, to determine the time when network interface device 12A should receive the next frame may be determined, based on equation (1), as follows:

Time of Next Frame=Burst_Enable+(125 us−(MOD ((100 us+300 us)/125 us)+6.4 us)).

In this example, the time of the next frame is 93.6 us. The value of 93.6 us indicates that network interface device 12A should receive the next frame 93.6 us after network interface device 12A transmitted information to OLT 4.

Synchronization module 26 may also determine the super-frame count for the next frame, based on equation (2), as follows:

Super-frame count for next frame=4000+DIV((100 us+300 us)/125 us)+1.

In this example, the super-frame count for the next frame is 4004. The value of 4004 indicates that the numerical identifier for the next frame, which should be received in 93.6 us, is 4004.

Based on the time when network interface device 12A should receive the next frame, and the numerical identifier for the next frame, synchronization module 26 may determine the time when network interface device 12A should receive the frame associated with the TOD information. As described above, the numerical identifier for the frame associated with the TOD information is frame 4200.

As described above, the temporal length of each frame may be 125 us. To determine the time when network interface device 12A should receive frame 4200 may be calculated based on equation (3).

Time when frame associated with TOD information is received=Time when next frame should be received+(super-frame count of frame associated with TOD information−super-frame count of next frame)*125 us. (3)

In this example, the time when network interface device 12A receives the frame associated with TOD information may be 93.6 us+(4200−4004)*125 us, which is 24593.6 us. The value of 24593.6 us indicates that network interface device 12A should receive frame 4200, which is associated with the TOD information, 24593.6 us after synchronization module 26 determines that network interface device 12A transmitted information to OLT 4.

In this manner, synchronization module 26 may determine the precise time to load the modified TOD information within storage locations. For example, after 24593.6 us, synchronization module 26 may load the modified TOD information, e.g., 100 seconds, 500 nanoseconds, within registers of TOD clock 28. In some examples, a clock generated by processor 16 may indicate when 24593.6 us have expired. In some alternate examples, XO clock 35 may indicate when 24593.6 us have expired, in examples where network interface device 12A includes XO clock 35.

As described above, G.984.3 Am. 2 may require network interface device 12A to load the modified TOD information when network interface device 12A receives the frame associated with the TOD information. However, processor 16 may not be configured to load the modified TOD information, and further may not indicate when network interface device 12A received the frame associated with the TOD information.

By utilizing some of the example techniques of this disclosure, synchronization module 26 may be configured to load the modified TOD information in accordance with G.984.3 Am. 2 even though processor 16 may have been developed prior to G.984.3 Am. 2. For example, utilizing the example techniques of this disclosure, synchronization module 26 may determine the precise time when network interface device 12A should receive the frame associated with the TOD information, which in this example is 24593.6 us after network interface device 12A transmits information.

Because synchronization module 26 may determine the precise time when to load the modified TOD information based on timing information defined by OLT 4, synchronization module 26 may be able to synchronize TOD clock 28 with the TOD clock on OLT 4. For example, as described above, OLT 4 may define the instances when network interface device 12A should transmit information. For instance, OLT 4 may define the frame, identified by its super-frame count, and the byte range within which network interface device 12A should transmit information to OLT 4.

After synchronization module 26 loads the TOD information within TOD clock 28 at the precise time determined by synchronization module 26, TOD clock 28 may be synchronized with the TOD clock on OLT 4. For example, the TOD information indicated by the TOD clock on OLT 4 may be substantially the same as the TOD information indicated by TOD clock 28 on network interface device 12A. In this manner, synchronization module 26 may synchronize TOD clock 28 with the TOD clock on OLT 4.

In some examples, TOD clock 28 may increment the TOD information as time elapses. For example, TOD clock 28 may increment the TOD information after every 8 ns have elapsed, e.g., based on a 125 MHz clock. However, the example of 8 ns is provided for illustration purposes, and should not be considered as limiting.

In some examples, processor 16 may generate a clock based on the information received from OLT 4. For example, processor 16 may include a clock and data recovery (CDR) circuit. The recovered clock may indicate the amount of elapsed time, and synchronization module 26 may cause TOD clock 28 to increment its counter based on the amount of elapsed time as indicated by the recovered clock from processor 16.

In some examples, the recovered clock may be unavailable. In these examples, and even in examples where the recovered clock is available, XO clock 35 may indicate the amount of elapsed time. XO clock 35 may be high quality external oscillator, as one example. There may be other examples of XO clock 35, and aspects of this disclosure should be not limited to the examples where XO clock 35 is a high quality external oscillator.

In examples where synchronization module 26 increments the TOD information based on the clock provided by processor 16, synchronization module 26 may only need to load the TOD information within TOD clock 28 once. After loading the TOD information one time, synchronization module 26 may be able to accurately increment the TOD information from the recovered clock from processor 16 because the recovered clock may not diverge as it is generated from the recovered information from OLT 4.

In examples where synchronization module 26 increments the TOD information based on the clock provided by XO clock 35, synchronization module 26 may need to periodically load the TOD information within TOD clock 28. For example, synchronization module 26 may need to periodically calculate the precise time when to load the TOD information within TOD clock 28 and load the TOD information accordingly. In these examples, synchronization module 26 may need to periodically calculate the precise time when to load the TOD information because the oscillator within XO clock 35 may diverge over time.

The TOD information, stored and incremented in TOD clock 28, may be utilized for various purposes. For example, network interface device 12A may generate one or more pulses, every one second, based on the TOD information stored and incremented in TOD clock 28. For example, every time synchronization module 26 increments TOD clock 28 by one second, network interface device 12A may generate the one or more pulses. The pulses may be utilized to synchronize mobile cellular base stations that may be located at relatively large distances away from one another, e.g., ten to a hundred miles apart. Moreover, the TOD information may be placed in a packet in accordance with the IEEE 1588 PTP protocol for transmission to various base stations. In this manner, the base stations may update their internal TOD information based on the received TOD information to synchronize each cellular based station.

Figure 3:
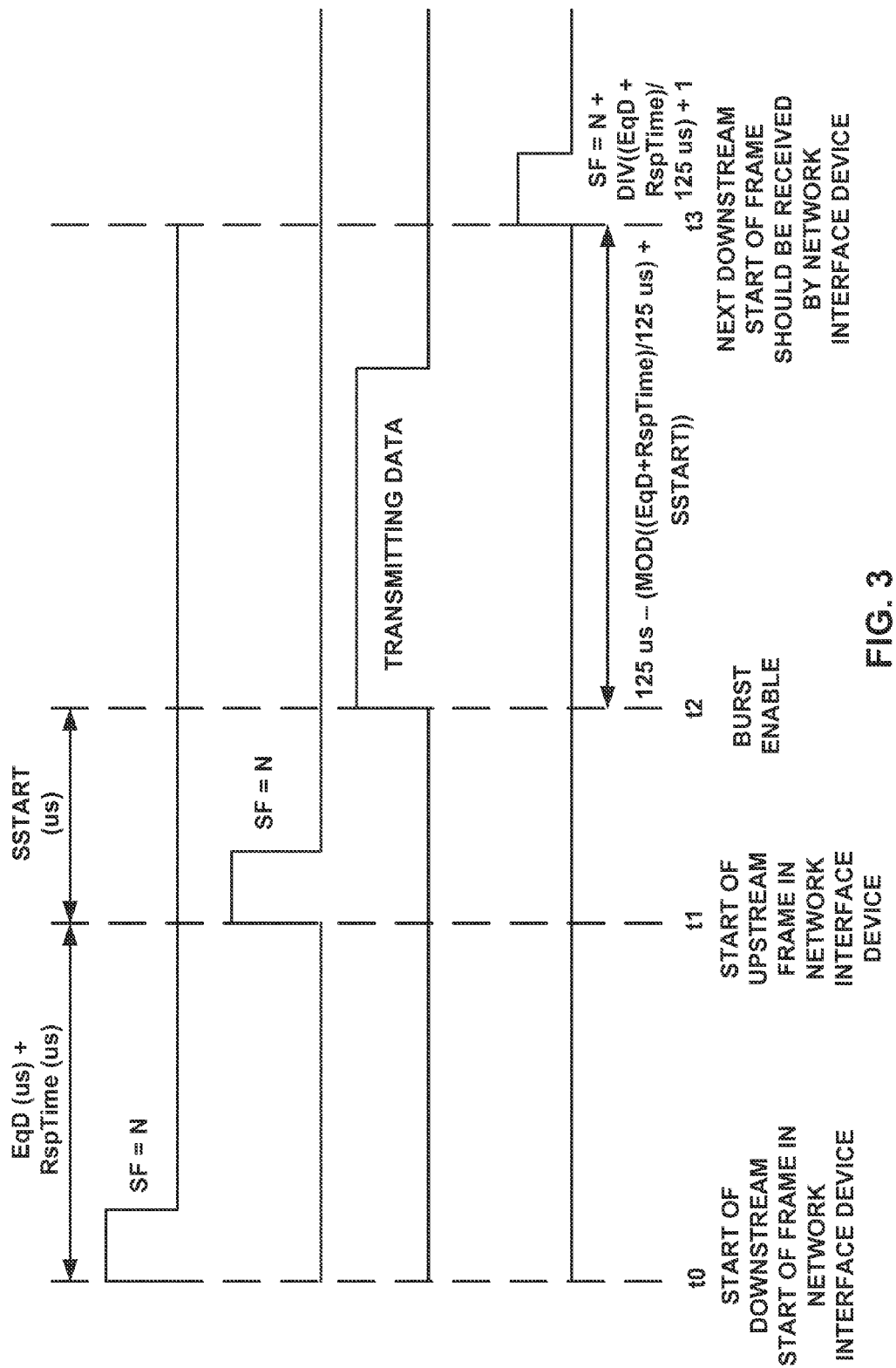
FIG. 3 is a timing diagram illustrating an example operation of an optical network.

FIG. 3 is a timing diagram illustrating an example operation of optical network 2. Prior to time t0, OLT 4 may transmit the bandwidth map to network interface device 12A. The bandwidth map may define the numerical identifier, e.g., super-frame count, of a frame, and the byte range within the frame, when network interface device 12A should transmit information to OLT 4. OLT 4 may also transmit the TOD information and the numerical identifier of the frame associated with the TOD information. Processor 16 may transmit the bandwidth map, the TOD information, and the numerical identifier of the frame associated with the TOD information to synchronization module 26.

At time t0, network interface device 12A may receive a downstream frame from OLT 4. For example, time t0 may be a start of downstream start of frame in network interface device 12A. The identifier of the frame, e.g., the super-frame count, may be N. For purposes of illustration, the super-frame count for the frame, e.g., SF, is equal to "N." N may be an integer value that is greater than or equal to one.

Time t1 may represent the start of upstream frame in network interface device 12A. Time t1 may represent the time of the equalization delay of network interface device 12A, e.g., EqD, and the response time of network interface device 12A, e.g., RspTime. For purposes of illustration, FIG. 3 illustrates that the equalization delay and response time are in microseconds. However, examples of this disclosure should not be considered limited to examples where the equalization delay and response time are in microseconds. Time t1 may also represent the beginning of the frame, within which network interface device 12A should transmit data. The numerical identifier for the frame, within which network interface device 12A should transmit data may also be N.

Time t2 may represent when processor 16 outputted the burst enable signal. Time t2 may represent the start time of when network interface device 12A may transmit information to OLT 4, e.g., SSTART. For purposes of illustration, FIG. 3 illustrates that the start time is in microseconds. However, examples of this disclosure should not be considered limited to examples where the start time is in microseconds. The start time may be calculated based on the byte range, provided in the bandwidth map, and the transmit rate of network interface device 12A. For example, if network interface device 12A is configured to transmit information at 1 Gbps, and the start of the byte range is 1000 bytes, the start time may be 8 us, e.g., 1 second/(1*10 bits)*8 bits per byte*1000 bytes equals 8 us. In this example, t2−t1 may equal 8 us. At time t2, network interface device 12A may transmit information within the current frame. The current frame may be identified by its numerical identifier, and may include the byte range within which network interface device 12A should transmit information to OLT 4.

At time t2, processor 4 may transmit the burst-enable signal to the laser driver within transceiver module 18. Synchronization module 26 may monitor the instances when network interface device 12A may transmit information by monitoring the burst-enable signal, the current through laser 31, or the current through photo-diode 33. For example, as illustrated in FIG. 3, at time t2, network interface device 12A may being transmitting data.

Time t3 may represent the time when network interface device 12A should receive a frame, e.g., a next frame, from OLT 4. To determine time t3, the monitored instances when network interface device 12A transmits information may function as a trigger that causes synchronization module 26 to determine when the frame should be received by network interface device 12A, e.g., synchronization module 26 may implement equation (1) described above. For example, to determine time t3, synchronization module 26 may perform the following calculations:

Time $t3$=Burst_Enable+(125 us−(MOD(($EqD$+$Rsp$-Time)/125 us)+$SSTART$))  (4)

In equation (4), 125 us represents the temporal length of each frame. However, the temporal length of each frame is not limited to 125 us. The temporal length of each frame may be greater than or less than 125 us. For example, the temporal length of the current frame and the next frame may be 125 us.

In some examples, synchronization module 26 may also determine the super-frame count for the next frame. Synchronization module 26 may then determine when the network interface device 12A should receive the frame associated with the TOD information. Synchronization module 26 may then load the modified TOD information based on the determined time when network interface device 12A should receive the frame associated with the TOD information. Synchronization module 26 may then synchronize clock 28 with the clock on OLT 4. In this manner, synchronization module 26 may configure network interface device 12A to be compliant with the G.984.3 Am. 2 standard.

To determine the super-frame count for the subsequent frame, synchronization module 12A may implement equation (5). As above, in equation (5), 125 us represents the temporal length of each frame, as one non-limiting example. In this example, N may be the numerical identifier for the current frame within which network interface device 12A should transmit information.

$SF$ for subsequent frame=$N$+DIV(($EqD$+$Rsp$Time)/125 us)+1  (5)

Figure 4:
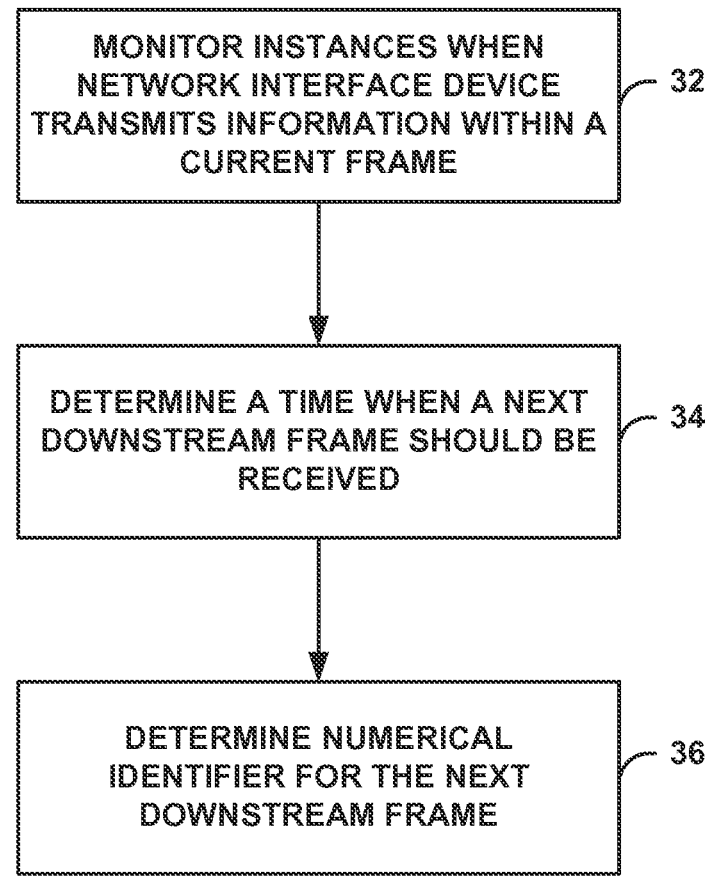
FIG. 4 is a flowchart illustrating an example operation of a network interface device.

FIG. 4 is a flowchart illustrating an example operation of network interface device 12A. For purposes of illustration, reference is made to FIG. 2. Synchronization module 26 may monitor one or more instances when network interface device 12A transmits information to OLT 4 within a current frame (32). For example, to monitor the one or more instances when network interface device 12A transmits information, synchronization module 26 may monitor the burst-enable signal to laser driver 23, the current through laser 31, or the current through photo-diode 33. The burst-enable signal, the current through laser 31, or the current through photo-diode 33 may indicate that network interface device 12A is transmitting information to OLT 4.

Based in part on the monitoring, synchronization module 26 may determine a time when a frame, e.g., a next downstream frame, should be received by network interface device 12A (34). The next frame may be a downstream frame transmitted by OLT 4. The one or more of the instances when network interface device 12A transmits data may function as a trigger that causes synchronization module 26 to implement the equations (1) or (4) to determine the next downstream frame should be received.

In some non-limiting examples, synchronization module 26 may also determine the identifier for the next downstream frame that should be received, e.g., the super-frame count, which may be the downstream framing information (36). For purposes of illustration, the identifier for the next downstream frame may be a numerical identifier such as a super-frame count. However, as described above, the identifier need not be limited to numerical identifiers. For example, synchronization module 26 may determine the quotient of the equalization delay plus response time of network interface device 12A divided by the temporal length of each frame. Synchronization module 26 may then sum the quotient with the super-frame count for the current frame and one. For example, synchronization module 26 may implement the equations (2) or (5) to determine the super-frame count.

Figure 5:
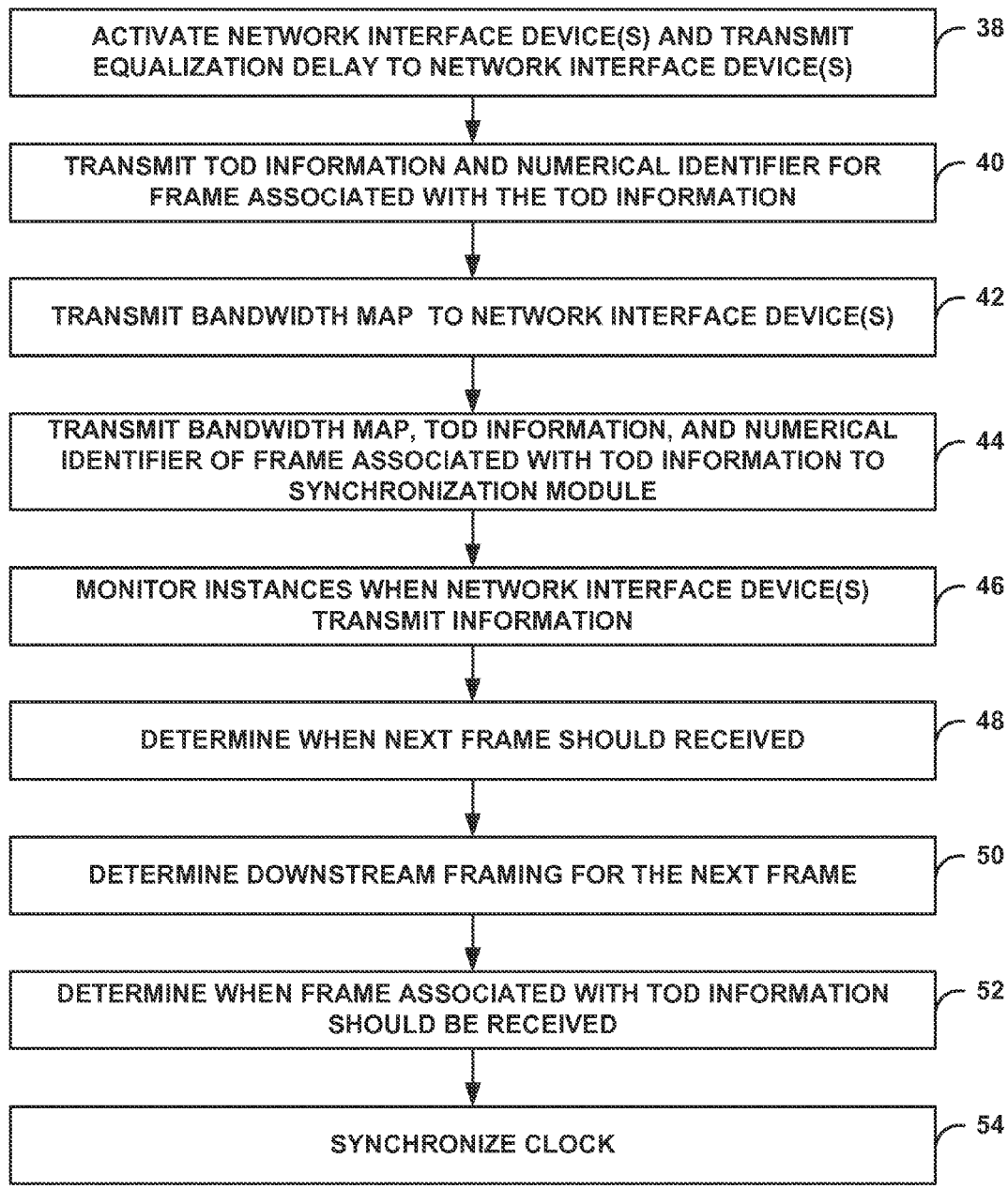
FIG. 5 is a flowchart illustrating an example operation of an optical network.

FIG. 5 is a flowchart illustrating an example operation of optical network 2. For purposes of illustration, reference is made to FIGS. 1 and 2. OLT 4 may activate one or more network interface devices 12, e.g., network interface device 12A (38). To activate network interface devices 12, OLT 4 may perform an auto-ranging process. During the auto-ranging process, OLT 4 may determine the propagation delay for each one of network interface devices 12. Also, to activate network interface devices 12, OLT 4 may calculate the equalization delay for network interface devices 12. OLT 4 may also transmit the equalization delay to network interface devices 12 (38).

OLT 4 may also transmit TOD information and the numerical identifier, e.g., super-frame count, for the frame associated with the TOD information (40). For example, OLT 4 may indicate that at frame 4000, the time of day is 1000 seconds. In this example, frame 4000 may be associated with the TOD information of 1000 seconds.

OLT 4 may transmit a bandwidth map to each one of the activated network interface devices 12 (42). The bandwidth map may define the instances for each one of network interface devices 12. The bandwidth map may include a numerical identifier, e.g., super-frame count, for a frame, and a byte range within the frame. Each one of network interface devices 12 may transmit information to OLT 4 during the byte range within the frame identified by its numerical identifier. The frame within which network interface devices 12 should transmit information may be referred to as a current frame. OLT 4 may transmit the bandwidth map to network interface devices 12 in a PLOAM or OMCI message. In some examples, OLT 4 may transmit the bandwidth map in a downstream frame.

Each processor within respective network interface devices 12 may transmit the bandwidth map, the TOD information, and the numerical identifier of the frame associated with the TOD information to respective synchronization modules (44). For example, processor 16 may transmit the bandwidth map, the TOD information, and the numerical identifier of the frame associated with the TOD information to synchronization module 26. In some examples, synchronization module 26 may modify the received TOD information to account for delays in the receiving the frame associated with the TOD information. In some alternate examples, processor 16 may modify the TOD information and transmit the modified TOD information to synchronization module 26.

Each one of network interface devices 12 may transmit information to OLT 4 during instances defined by the bandwidth map. Furthermore, each synchronization module may monitor the instances when respective network interface devices transmitted information to OLT 4 (46). For example, synchronization module 26, of network interface device 12A, may monitor the instances when network interface device 12A transmitted information to OLT 4. Synchronization module 26 may monitor the burst-enable signal to laser driver 23, the current through laser 31, or the current through photo-diode 33, as three non-limiting examples, to monitor the instances when network interface device 12A transmitted information to OLT 4.

Based on when each one of network interface devices 12 transmit information to OLT, synchronization modules may determine a time when a next frame should be received by respective network interface devices 12 (48). For example, the instances when network interface device 12A transmits information may function as a trigger that causes synchronization module 26 to determine when network interface device 12A should receive the next frame. Synchronization module 26 may determine when network interface device 12A should receive the next frame based on equations (1) and (4), as described above.

In some examples, synchronization modules in respective network interface devices 12 may determine the downstream framing information for the next frame (50). The downstream framing information for the next frame may be its numerical identifier, e.g., its super-frame count. For example, synchronization module 26 may determine the numerical identifier for the next frame based on equations (2) and (5), as described above.

Each synchronization module may then determine when the frame associated with the TOD information should be received by respective network interface devices 12 (52). For example, by block 52, synchronization module 26 may have determined when network interface 12A should receive the next frame and the numerical identifier of the next frame. Synchronization module 26 may then subtract the numerical identifier of the next frame from the numerical identifier of the frame associated with the TOD information. Synchronization module 26 may then multiply the resulting value with the temporal length each frame, e.g., 125 us. Synchronization module 26 may then sum the resulting value with time when network interface device 12A should receive the next frame, as described above with respect to equation (3).

Each synchronization module may then synchronize respective TOD clocks on network interface devices 12 with the TOD clock on OLT 4 (54). For example, synchronization module 26 may load the modified TOD information, within TOD clock 28, when network interface device 12A receives the frame associated with the TOD information. Synchronization module 26 may determine when network interface device 12A should receive the frame associated with the TOD information based on the time when network interface device 12A should receive the next frame and the numerical identifier of the next frame, as described above with respect to block 52. Synchronization module 26 may then load the modified TOD information within TOD clock 28. In this manner, the synchronization modules may synchronize the clocks on respective network interface devices 12, e.g., TOD clock 28, in accordance with G984.3 Am. 2, even though processors on network interface devices 12 may have been developed prior to G984.3 Am. 2.

The example techniques described above may configure network interface devices 12 to be compliant with G984.3 Am. 2. However, aspects of this disclosure are not so limited. In some examples, OLT 4 may not be configured to be compliant with G984.3 Am. 2. For example, OLT 4 may not transmit the numerical identifier of a frame that is associated with the TOD information. In these examples, the TOD information may not be associated to a frame identified by its numerical identifier. Rather, in these examples, the TOD information may be associated with the next frame that is transmitted by OLT 4. For example, OLT 4 may transmit the TOD information at the next frame, and may not transmit the numerical identifier for the next frame. Aspects of this disclosure may be extendable to examples where OLT 4 is not configured to be compliant with G984.3 Am. 2.

Figure 6:
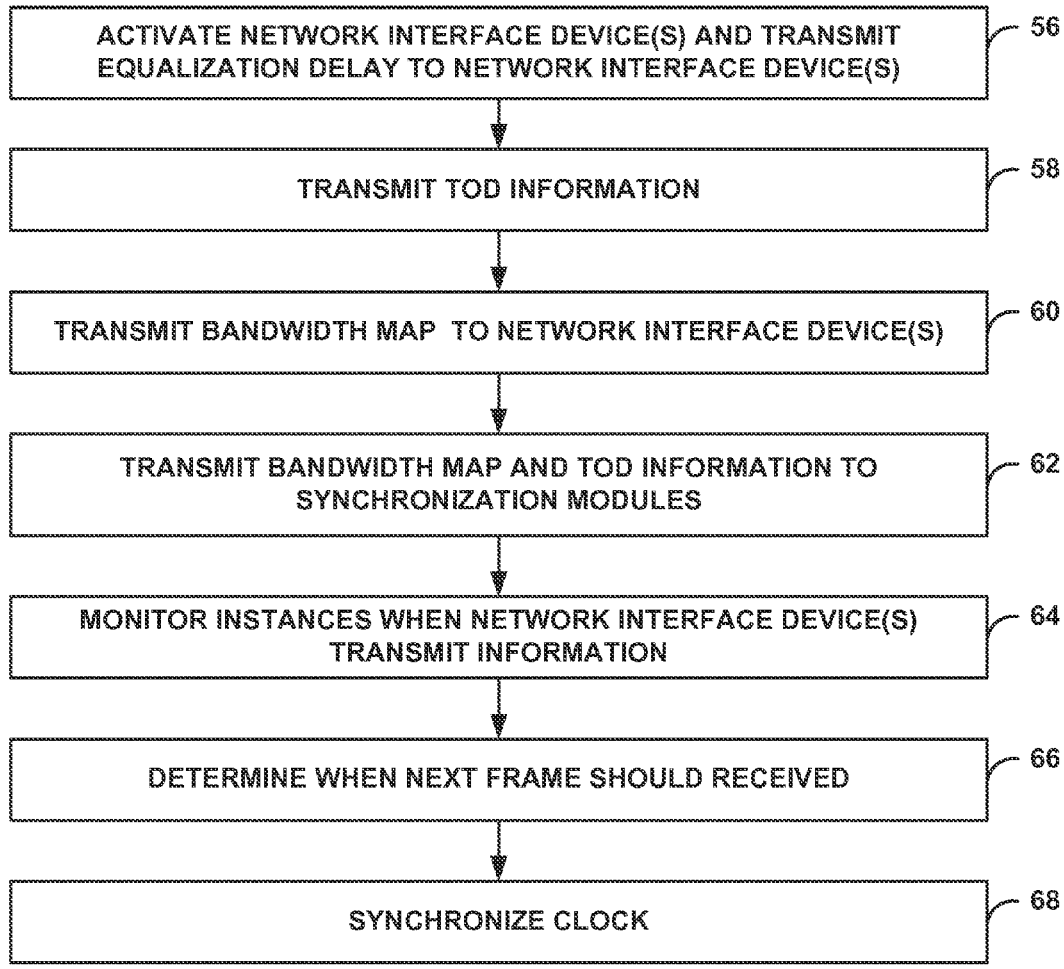
FIG. 6 is a flowchart illustrating another example operation of an optical network.

FIG. 6 is a flowchart illustrating another example operation of optical network 2. For purposes of illustration, reference is made to FIGS. 1 and 2. The example flowchart of FIG. 6 may be applicable to instances where OLT 4 is not configured to be compliant with G984.3 Am. 2. For example, in the example flowchart of FIG. 6, OLT 4 may not transmit the numerical identifier for the frame associated with the TOD information. Rather. OLT 4 may transmit the TOD information that is associated with the next frame that should be received by network interface devices 12. In these instances, it may not be necessary to transmit the numerical identifier for the frame associated with the TOD information.

Similar to the flowchart of FIG. 5, OLT 4 may active one or more network interface devices 12 and transmit the equalization delay to each one of network interface devices 12 (56). OLT 4 may then transmit the TOD information to each one of network interface devices 12 (58). In this example, OLT 4 may not transmit the numerical identifier of the frame associated with the TOD information. In this example, the TOD information may be associated with the next frame that network interface devices 12 should receive. Also, similar to flowchart of FIG. 5, OLT 4 may transmit a bandwidth map to each one of the activated network interface devices 12 (60).

Each processor within respective network interface devices 12 may transmit the bandwidth map and the TOD information to respective synchronization modules (62). For example, processor 16 may transmit the bandwidth map and the TOD information to synchronization module 26. In some examples, synchronization module 26 may modify the received TOD information to account for delays in the receiving the frame associated with the TOD information. In some alternate examples, processor 16 may modify the TOD information and transmit the modified TOD information to synchronization module 26. In this example, it may not be necessary to transmit the numerical identifier of the frame associated with the TOD information because the frame associated with the TOD information may be next frame received by network interface device 12A.

Each synchronization module may monitor the instances when respective network interface devices transmitted information to OLT 4 (64). For example, as described above, synchronization module 26, of network interface device 12A, may monitor the instances when network interface device 12A transmitted information to OLT 4. Synchronization module 26 may monitor the burst-enable signal to laser driver 23, the current through laser 31, or the current through photodiode 33, as three non-limiting examples, to monitor the instances when network interface device 12A transmitted information to OLT 4.

Based on when each one of network interface devices 12 transmit information to OLT, synchronization modules may determine a time when a next frame should be received by respective network interface devices 12 (66). For example, as described above, the instances when network interface device 12A transmits information may function as a trigger that causes synchronization module 26 to determine when network interface device 12A should receive the next frame. Synchronization module 26 may determine when network interface device 12A should receive the next frame based on equations (1) and (4), as described above.

In the example of FIG. 6, the TOD information may be associated with the next frame received by network interface devices 12. In this example, each synchronization module may load the TOD information in storage locations when respective network interface devices 12 receive the next frame to synchronize the clock on network interface devices 12 with the clock on OLT 4 (68). For example, synchronization module 26 may determine when network interface device 12A should receive the next frame. Based on the determine time when network interface device 12A should receive the next frame, synchronization module 26 may load the TOD information in TOD clock 28. In this manner, synchronization module 26 may synchronize TOD clock 28 with the TOD clock on OLT 4 even when OLT 4 does not transmit the numerical identifier for the frame associated with the TOD information.

The techniques described herein may be implemented in hardware, software, firmware, or any combination thereof. Various features described as modules, units or components may be implemented together in an integrated logic device or separately as discrete but interoperable logic devices or other hardware devices, including optical hardware components. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as RAM, SDRAM, ROM, NVRAM, EEPROM, FLASH memory, magnetic or optical data storage media, and the like. The techniques additionally, or alternatively, may be realized at least in part by a computer-readable communication medium that carries or communicates code in the form of instructions or data structures and that can be accessed, read, and/or executed by a computer.

The code or instructions may be software and/or firmware executed by processing circuitry including one or more processors, such as one or more DSPs, general purpose microprocessors, ASICs, FPGAs, ASSPs, or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various aspects have been described in this disclosure. These and other aspects are within the scope of the following claims.

The invention claimed is:

1. A method comprising:
    receiving, with a network interface device, an equalization delay and a byte range that define when the network interface device should transmit information to an optical line terminal (OLT);
    determining, with the network interface device, a start time based on the byte range;
    determining, with the network interface device, a response time of the network interface device;
    monitoring, with the network interface device, one or more instances when the network interface device transmits the information to the OLT within a current frame, wherein the network interface device transmits the current frame having the information; and
    determining, with the network interface device, a time when a next frame should be received by the network interface device based on the monitored one or more instances when the network interface device transmits information to the OLT, the equalization delay, the start time, the response time, and a temporal length of each frame, wherein the OLT transmits the next frame.

2. The method of claim 1, wherein monitoring one or more instances when the network interface device transmits information to the OLT comprises at least one of monitoring a burst-enable signal, monitoring an electrical current through a laser coupled to the network interface device, and monitoring an electrical current through a photo-diode coupled to the network interface device.

3. The method of claim 2, further comprising:
    receiving time of day (TOD) information associated with a subsequent frame;
    modifying the TOD information to account for delays in the network interface device for receiving the TOD information;
    determining a time when the subsequent frame associated with the TOD information should be received by the network interface device based on the determined time when the next frame should be received; and
    loading the modified TOD information, within a TOD clock on the network interface device, based on the time when the subsequent frame associated with the TOD information should be received by the network interface device to synchronize the TOD clock on the network interface device with a TOD clock on the OLT.

4. The method of claim 3, wherein the next frame comprises the subsequent frame associated with the TOD information.

5. The method of claim 1, further comprising:
    determining an identifier for the next frame;
    receiving time of day (TOD) information associated with a subsequent frame and an identifier for the subsequent frame associated with the TOD information;
    modifying the TOD information to account for delays in the network interface device for receiving the TOD information;
    determining when the subsequent frame associated with the TOD information should be received by the network interface device based at least on the identifier for the subsequent frame associated with the TOD information, the identifier for the next frame, and the determined time when the next frame should be received by the network interface device; and
    loading the modified TOD information, within a TOD clock on the network interface device, for the subsequent frame associated with the TOD information based on the determination of when the subsequent frame associated with the TOD information should be received by the network interface device to synchronize the TOD clock on the network interface device with a TOD clock on the OLT.

6. The method of claim 5, further comprising:
    receiving an identifier for the current frame;
    wherein determining an identifier for the next frame comprises determining the identifier for the next frame based at least on the identifier for the current frame, the equalization delay of the network interface device, the response time of the network interface device, and the temporal length of each frame.

7. The method of claim 1, wherein receiving the equalization delay and the byte range comprises receiving the equalization delay and the byte range in at least one of a physical layer operations and maintenance (PLOAM) message and an optical network unit (ONU) management control interface (OMCI) message.

8. The method of claim 1, wherein the network interface device and the OLT are part of a passive optical network or an active optical network.

9. An optical network comprising:
    a network interface device that includes a processor to transmit information to an optical line terminal (OLT), wherein the processor is configured to:

receive an equalization delay and a byte range that define when the network interface device should transmit information to the OLT;

determine a response time of the network interface device; and a synchronization module configured to:

determine a start time based on the byte range;

monitor one or more instances when the network interface device transmits the information to the OLT within a current frame, wherein the network interface device transmits the current frame having the information; and determine a time when a next frame should be received by the network interface device based on the monitored one or more instances when the network interface device transmits information to the OLT, the equalization delay, the start time, the response time, and a temporal length of each frame, wherein the OLT transmits the next frame.

10. The optical network of claim 9, wherein the synchronization module monitors at least one of a burst-enable signal from the processor, an electrical current through a laser coupled to the network interface device, and an electrical current through a photo-diode coupled to the network interface device to monitor the one or more instances when the network interface device transmits information to the OLT.

11. The optical network of claim 10, wherein the processor is configured to receive time of day (TOD) information associated with a subsequent frame, wherein at least one of the processor and synchronization module modifies the TOD information to account for delays in the network interface device for receiving the TOD information and determine a time when the subsequent frame associate with the TOD information should be received by the network interface device based on the determined time when the next frame should be received, and wherein the synchronization module loads the modified TOD information, within a TOD clock on the network interface device, based on the determined time when the subsequent frame associated with the TOD information should be received by the network interface device to synchronize the TOD clock on the network interface device with a TOD clock on the OLT.

12. The optical network of claim 11, wherein the next frame comprises the subsequent frame associated with the TOD information.

13. The optical network of claim 11, wherein at least one of the processor and synchronization module includes the TOD clock.

14. The optical network of claim 9, wherein the synchronization module is further configured to determine an identifier for the next frame, wherein the network interface device receives time of day (TOD) information associated with a subsequent frame and an identifier for the subsequent frame associated with the TOD information, wherein at least one of the processor and synchronization module modify the TOD information to account for delays in the network interface device for receiving the TOD information, wherein the synchronization module is further configured to determine when the subsequent frame associated with the TOD information should be received by the network interface device based at least on the identifier for the subsequent frame associated with the TOD information, the identifier for the next frame, and the determined time when the next frame should be received by the network interface device, and wherein the synchronization module loads the modified TOD information, within a TOD clock on the network interface device, for the subsequent frame associated with the TOD information based on the determination of when the subsequent frame associated with the TOD information should be received by the network interface device to synchronize the TOD clock on the network interface device with a TOD clock on the OLT.

15. The optical network of claim 14, wherein the synchronization module receives an identifier for the current frame, wherein the synchronization module determines the identifier for the next frame based at least on the identifier for the current frame, the equalization delay of the network interface device, the response time of the network interface device, and the temporal length of each frame.

16. The optical network of claim 9, wherein the processor receives the equalization delay and the byte range in at least one of a physical layer operations and maintenance (PLOAM) message and an optical network unit (ONU) management control interface (OMCI) message.

17. The optical network of claim 9, further comprising the OLT.

18. The optical network of claim 9, wherein the network interface device includes the synchronization module, and wherein the synchronization module is external to the processor.

19. The optical network of claim 9, wherein the optical network comprises one of a passive optical network and an active optical network.

20. An optical network comprising:

means for receiving an equalization delay and a byte range that define when a network interface device should transmit information to an optical line terminal (OLT);

means for determining a start time based on the byte range;

means for determining a response time of the network interface device;

means for monitoring one or more instances when the network interface device transmits the information to the OLT within a current frame, wherein the network interface device transmits the current frame having the information; and means for determining a time when a next frame should be received by the network interface device based on the monitored one or more instances when the network interface device transmits information to the OLT, the equalization delay, the start time, the response time, and a temporal length of each frame, wherein the OLT transmits the next frame.

21. The optical network of claim 20, wherein the means for monitoring one or more instances when the network interface device transmits information to the OLT comprise at least one of means for monitoring a burst-enable signal, monitoring an electrical current through a laser coupled to the network interface device, and monitoring an electrical current through a photo-diode coupled to the network interface device.

22. The optical network of claim 21, further comprising:

means for receiving time of day (TOD) information associated with a subsequent frame;

means for modifying the TOD information to account for delays in the network interface device for receiving the TOD information;

means for determining when the subsequent frame associated with the TOD information should be received by the network interface device based on the determined time when the next frame should be received; and means for loading the modified TOD information, within a TOD clock on the network interface device, based on the time when the subsequent frame associated with the TOD information should be received by the network interface device to synchronize the TOD clock on the network interface device with a TOD clock on the OLT.

23. The optical network of claim 20, further comprising:

means for determining an identifier for the next frame;

means for receiving time of day (TOD) information associated with a subsequent frame and an identifier for the subsequent frame associated with the TOD information;

means for modifying the TOD information to account for delays in the network interface device for receiving the TOD information;

means for determining when the subsequent frame associated with the TOD information should be received by the network interface device based at least on the identifier for the subsequent frame associated with the TOD information, the identifier for the next frame, and the determined time when the next frame should be received by the network interface device; and means for loading the modified TOD information, within a TOD clock of the network interface device, for the subsequent frame associated with the TOD information based on the determination of when the subsequent frame associated with the TOD information should be received by the network interface device to synchronize the TOD clock on the network interface device with a TOD clock on the OLT.

24. A non-transitory computer-readable storage medium comprising instructions that cause one or more processors to:

receive an equalization delay and a byte range that define when a network interface device should transmit information to an optical line terminal (OLT);

determine a start time based on the byte range;

determine a response time of the network interface device;

monitor one or more instances when the network interface device transmits the information to the OLT within a current frame, wherein the network interface device transmits the current frame having the information; and determine a time when a next frame should be received by the network interface device based on the monitored one or more instances when the network interface device transmits information to the OLT, the equalization delay, the start time, the response time, and a temporal length of each frame, wherein the OLT transmits the next frame.

25. The non-transitory computer-readable storage medium of claim 24, wherein the instructions that cause the one or more processors to monitor one or more instances when the network interface device transmits information to the OLT comprise instructions that cause the one or more processors to at least one of monitor a burst-enable signal, monitor an electrical current through a laser coupled to the network interface device, and monitor an electrical current through a photo-diode coupled to the network interface device.

* * * * *